(12) United States Patent
Kovacic et al.

(10) Patent No.: US 8,485,058 B2
(45) Date of Patent: Jul. 16, 2013

(54) ELECTRIC MOTOR-DRIVEN KITCHEN APPLIANCE PROVIDED WITH A BAYONET LOCK FOR AN ELECTRIC MOTOR AND A GEAR STAGE AND METHOD FOR ASSEMBLING SAID ELECTRIC MOTOR-DRIVEN KITCHEN APPLIANCE

(75) Inventors: Peter Kovacic, Gomilsko (SI); Jurij Pesec, Petrovce (SI)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 933 days.

(21) Appl. No.: 11/991,048

(22) PCT Filed: Aug. 16, 2006

(86) PCT No.: PCT/EP2006/065357
§ 371 (c)(1),
(2), (4) Date: Feb. 25, 2008

(87) PCT Pub. No.: WO2007/023122
PCT Pub. Date: Mar. 1, 2007

(65) Prior Publication Data
US 2009/0249908 A1   Oct. 8, 2009

(30) Foreign Application Priority Data
Aug. 26, 2005   (DE) .................. 10 2005 040 547

(51) Int. Cl.
*F16H 1/16* (2006.01)
(52) U.S. Cl.
USPC ............................................ 74/425; 366/254

(58) Field of Classification Search
USPC ............ 74/425, 412 R, 413, 414, 416, 421 A, 74/421 R; 366/98, 252–254, 283
See application file for complete search history.

(56) References Cited

U.S. PATENT DOCUMENTS

| | | | | | |
|---|---|---|---|---|---|
| 1,891,925 | A | * | 12/1932 | Hackett | 74/16 |
| 1,898,945 | A | * | 2/1933 | Fitzgerald | 279/22 |
| 1,964,855 | A | * | 7/1934 | Moore | 601/112 |
| 2,026,006 | A | * | 12/1935 | Wennerstrom | 74/421 A |
| 2,037,890 | A | * | 4/1936 | Dow | 173/170 |
| 2,046,784 | A | * | 7/1936 | Krause | 219/209 |
| 2,101,515 | A | * | 12/1937 | Schmitter | 74/421 R |
| 2,185,155 | A | * | 12/1939 | Meeker et al. | 366/199 |
| 2,468,929 | A | * | 5/1949 | Holt et al. | 74/421 A |
| 2,561,279 | A | * | 7/1951 | Holt | 15/49.1 |
| 2,606,257 | A | * | 8/1952 | Briskin | 200/47 |
| 2,617,375 | A | * | 11/1952 | Peets | 112/220 |
| 2,621,907 | A | * | 12/1952 | Maurer et al. | 366/207 |
| 2,765,676 | A | * | 10/1956 | Polivka et al. | 74/606 R |
| 2,798,700 | A | * | 7/1957 | Corbett et al. | 366/200 |
| 2,812,166 | A | * | 11/1957 | Deangelis et al. | 366/199 |

(Continued)

FOREIGN PATENT DOCUMENTS
CN   2278137 Y   4/1998
DE   457 134    3/1928

*Primary Examiner* — Michael P Ferguson
*Assistant Examiner* — Daniel Wiley
(74) *Attorney, Agent, or Firm* — James E. Howard; Andre Pallapies

(57) ABSTRACT

An electric motor-driven kitchen appliance includes an electric motor and a gear stage. The electric motor includes a motor housing and the gear stage includes a gear case. The motor housing and gear stage are connected to each other by a bayonet lock. The electric motor and the gear stage are provided with the respective bayonet lock parts designed for the kitchen appliance.

12 Claims, 11 Drawing Sheets

U.S. PATENT DOCUMENTS

| | | | | |
|---|---|---|---|---|
| 3,301,081 A * | 1/1967 | Kern, Jr. | | 74/421 A |
| 3,367,210 A * | 2/1968 | Scott | | 74/665 K |
| 3,533,715 A * | 10/1970 | Gross | | 416/174 |
| 3,574,978 A * | 4/1971 | Block | | 451/509 |
| 3,848,477 A * | 11/1974 | Giandinoto et al. | | 74/425 |
| 3,951,351 A * | 4/1976 | Ernster et al. | | 241/101.1 |
| 4,103,511 A * | 8/1978 | Kress et al. | | 464/177 |
| 4,131,034 A * | 12/1978 | Rolf | | 475/11 |
| 4,185,514 A * | 1/1980 | Edwards | | 74/425 |
| 4,283,645 A * | 8/1981 | Hofmann | | 310/87 |
| 4,615,230 A * | 10/1986 | Guichard | | 74/427 |
| 4,898,518 A * | 2/1990 | Hubbard et al. | | 417/360 |
| 5,056,213 A * | 10/1991 | Behnke et al. | | 29/596 |
| 6,639,335 B1 | 10/2003 | Lauk et al. | | |
| 6,827,305 B2 * | 12/2004 | Brezovnik et al. | | 241/101.2 |
| 7,306,362 B2 * | 12/2007 | Lim et al. | | 366/201 |
| 7,329,065 B2 * | 2/2008 | Hu et al. | | 403/349 |
| 7,444,915 B2 * | 11/2008 | Kovacic et al. | | 83/707 |
| 7,500,413 B2 * | 3/2009 | Huang et al. | | 74/425 |
| 7,614,779 B2 * | 11/2009 | Ta et al. | | 366/98 |
| 2003/0066371 A1 * | 4/2003 | Petocchi et al. | | 74/421 A |
| 2003/0076739 A1 * | 4/2003 | Brezovnik et al. | | 366/349 |
| 2004/0129101 A1 * | 7/2004 | Mineshima | | 74/423 |
| 2005/0050741 A1 * | 3/2005 | Kovacic et al. | | 30/391 |
| 2005/0276158 A1 * | 12/2005 | Thomas | | 366/250 |
| 2006/0117890 A1 * | 6/2006 | Li et al. | | 74/425 |
| 2007/0193384 A1 * | 8/2007 | Hormann | | 74/421 A |
| 2008/0197733 A1 * | 8/2008 | Oberle et al. | | 310/89 |
| 2009/0071279 A1 * | 3/2009 | Huck | | 74/425 |
| 2009/0084274 A1 * | 4/2009 | Kovacic et al. | | 99/492 |
| 2009/0120225 A1 * | 5/2009 | Saya et al. | | 74/421 A |
| 2009/0147618 A1 * | 6/2009 | Kovacic et al. | | 366/252 |

* cited by examiner

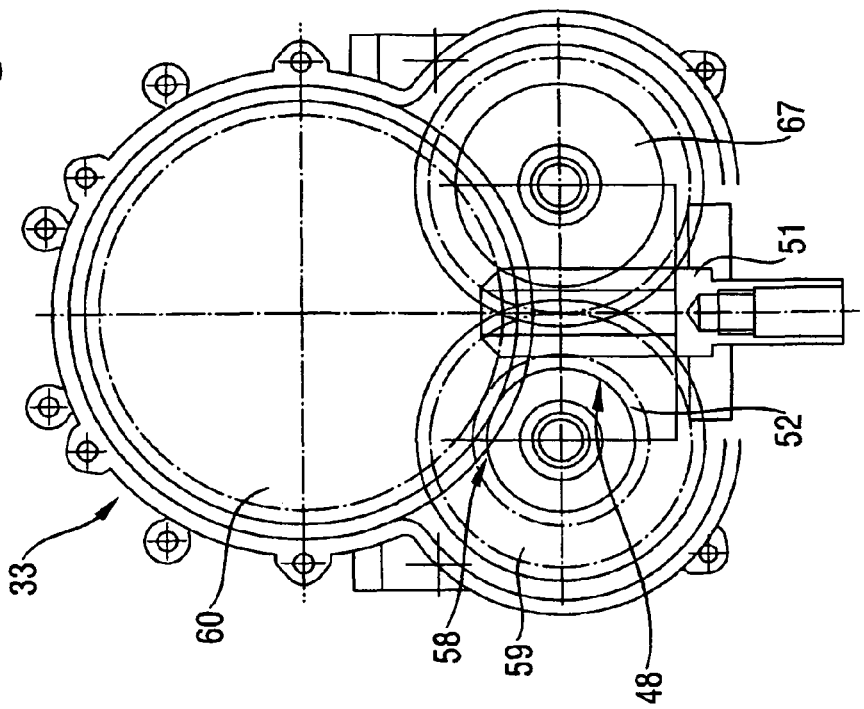
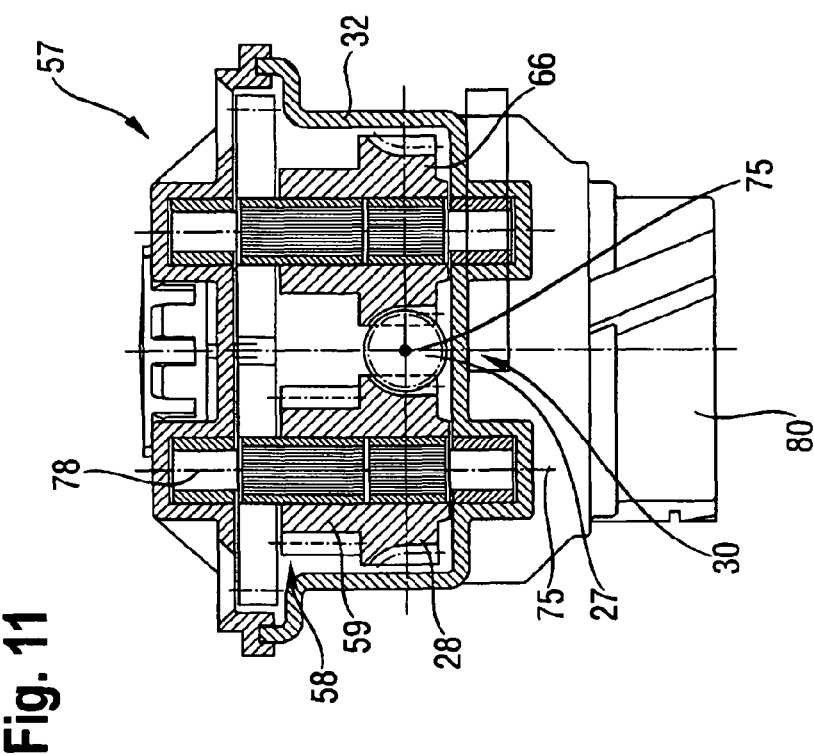

ELECTRIC MOTOR-DRIVEN KITCHEN APPLIANCE PROVIDED WITH A BAYONET LOCK FOR AN ELECTRIC MOTOR AND A GEAR STAGE AND METHOD FOR ASSEMBLING SAID ELECTRIC MOTOR-DRIVEN KITCHEN APPLIANCE

The invention relates to an electric motor-driven kitchen appliance, in particular to a single- or multipurpose kitchen appliance comprising an electric motor and a gear stage, the electric motor comprising a motor housing and the gear stage comprising a gear case; as well as an electric motor and a gear stage for the kitchen appliance and a method for assembling an electric motor-driven kitchen appliance, in particular electric motor-driven single- or multipurpose kitchen appliances.

DE 25 51 842 discloses an electric motor-driven drive unit for kitchen appliances with a planetary gear set comprising a bevel gear toothing, the planet wheel thereof circulating in an inclined axis and intersecting the axis of the central wheel with its axis, by means of the planetary gear set a wobble motion of the driven tool being effected about the central wheel.

The manufacture of known kitchen appliances generally provides that both an electric motor and a gear stage have to be inserted into an appliance housing of the kitchen appliance, in order to be brought into mutual engagement at that point, testing and/or specifying the kitchen appliance only being possible in the fully assembled state of the kitchen appliance. The assembly and/or manufacture of the known kitchen appliances is thus comparatively complicated.

It is the object of the present invention to provide an electric motor-driven kitchen appliance, an electric motor and/or a gear stage for the kitchen appliance, as well as a method for assembling an electric motor-driven kitchen appliance, whereby a simple and cost-effective assembly and/or manufacture of a kitchen appliance is made possible.

This object is achieved according to the invention by an electric motor-driven kitchen appliance, by the electric motor and/or a gear stage for the kitchen appliance as well as by a method for preassembling an electric motor-driven kitchen appliance, as provided therein.

The inventive electric motor-driven kitchen appliance, in particular the electric motor-driven single- or multipurpose kitchen appliance, comprising an electric motor and a gear stage, the electric motor comprising a motor housing and the gear stage comprising a gear case, provides that the motor housing and the gear case are connected to one another by means of a bayonet lock.

The assembly of the electric motor, the gear stage and the electric motor-gear stage arrangement may take place separately on a separate assembly line. As a result, a simple assembly of the end product is made possible. Moreover, quality control of the drive before installation in the appliance housing of the kitchen appliance is possible. By means of the bayonet lock, the electric motor may be connected in a simple manner to the gear stage, for which only few movements are required. The bayonet lock also ensures that the electric motor is correctly aligned to the gear stage.

The gear stage is attached, in particular, directly to the electric motor, i.e. it may be connected to the motor shaft, in particular directly and immediately. By the term "electric motor" is understood, in particular, the motor without additional gear devices.

A bayonet lock is generally denoted as a device for the simple releasable connection of two parts in the direction of their longitudinal axis, the one part which is pushed over the other having an elongated slot, at the end of which a short transverse slot is placed substantially at right angles and/or slightly obliquely, and the other part in contrast having a projection which is inserted into the transverse slot and then produces the fixed connection. With a bayonet lock, the connection generally takes place via a plug-and-twist movement: the two parts to be connected are placed inside one another; in both parts, elongated raised portions are attached at the connecting points, approximately perpendicular to their plug-in direction. Said raised portions, however, do not extend all around but are interrupted (otherwise the fitting into one another would not be possible). As the raised portions are located slightly obliquely in the plane perpendicular to the plug-in direction, both parts are pressed against one another by a rotational movement. The bayonet lock thus operates as a screw thread. Sometimes, for securing the connection a latch may be additionally used. Alternatively to the method of the moldings engaging in one another, a correspondingly formed concave portion may also be used on one part and a convex portion on the other part.

The bayonet lock thus allows a simple but secure connection between the electric motor and the gear stage. The bayonet lock is, in particular, configured as a quick coupling.

The motor housing may be made of glass fiber-reinforced plastics or carbon fiber-reinforced plastics or injection-molded material. The gear case may be made of glass fiber-reinforced plastics or carbon fiber-reinforced plastics or injection-molded material.

The bayonet lock has, in particular, a locking angle of less than 180°, in particular less than 90°, preferably less than 45°.

Advantageously, the electric motor has a single rotational direction which acts in the locking direction of the bayonet lock and effects self-locking of the bayonet lock during operation. The electric motor, in this case, either only rotates clockwise or only rotates anticlockwise. As a result of the rotation of the motor shaft, the gear stage is pulled against the electric motor. The gear case, in this case, has a fixed connected to the motor housing.

Advantageously, a rotationally fixed connection of a motor shaft of the electric motor to a gear shaft of the gear stage is produced by means of a worm gear set. By means of a worm gear set it is possible by simple means to form a rapid connection of the electric motor to the gear stage. In this case, a gearing worm which is fastened to a motor shaft of the electric motor, may engage in the inside of the gear stage and at that point create a connection with a worm gear.

The worm gear set advantageously comprises a gearing worm on the motor side and at least one worm gear on the gear side, preferably two worm gears opposing the gearing worm on the gear side. More specifically, only one worm gear is required for the transmission of a torque, but a shear force or counter force may be absorbed by a worm mating gear located opposite relative to the gearing worm, so that the gearing worm does not disengage from the worm gear under load. As a result, wear of the worm gear set is reduced.

Advantageously, the motor housing and the gear case are additionally fixed to one another by a reinforcement frame. In this case, the reinforcement frame may be pulled over the motor housing and/or the gear case, so that a particularly torsion-proof connection is produced between the motor housing and the gear case.

The bayonet lock comprises, in particular, a lock rotational axis, which substantially coincides with a motor rotational axis. As a result, motor torques may be utilized, in particular, in order to tighten the bayonet lock more tightly.

The kitchen appliance advantageously comprises an appliance housing in which the electric motor connected to the gear stage may be inserted. By means of the bayonet lock, a preassembly of the gear stage with the electric motor is permitted and/or simplified, which permits testing and/or specifying and/or quality control before installation in an appliance housing of the kitchen appliance. In particular by means of noise measurement, it may be established whether the preassembled electric motor-gear stage arrangement thus obtained functions without fault.

The electric motor according to the invention comprises a first bayonet lock part and is suitable and intended for the kitchen appliance according to the invention.

The gear stage according to the invention comprises a second bayonet lock part and is suitable and intended for a kitchen appliance according to the invention. Both the electric motor and the gear stage and the electric motor-gear stage arrangement may be manufactured separately and may thus be incorporated in a modular manner in the manufacturing process of the kitchen appliance. This reduces considerably the complexity of the manufacture and thus also the costs.

The method according to the invention for assembling an electric motor-driven kitchen appliance, in particular a kitchen appliance according to the invention, comprising an electric motor and a gear stage, the electric motor comprising a motor housing and the gear stage comprising a gear case, provides the following method steps: preassembling the electric motor in the motor housing, preassembling the gear stage in the gear case, connecting the motor housing and the gear case by means of a bayonet lock such that a motor shaft of the electric motor and a gear shaft have a fixed connection to one another as regards rotation.

The inventive method makes possible a particularly simple, reliable and cost-effective assembly and/or manufacture of an electric motor-driven kitchen appliance. Given the characteristics of the bayonet lock, the kitchen appliance is of modular construction, which offers product flexibility. Advantageously, the twist-and-plug motion of the locking of the bayonet lock takes place substantially around the motor shaft. Particularly preferably, in this case, the rotational movement is carried out in the direction of the rotational direction of the motor shaft during operation.

Further advantageous details and embodiments, which may be individually applied or combined with one another in any manner, are described in more detail with reference to the following drawings, which do not limit the invention but are merely intended to illustrate the invention by way of example.

In the drawings, schematically:

FIG. 11 shows a cross section extending perpendicular to the motor rotational axis through a gear stage of a kitchen appliance according to the invention;

FIG. 12 shows a schematic plan view of a gear stage arrangement of a kitchen appliance according to the invention;

Figure 1:
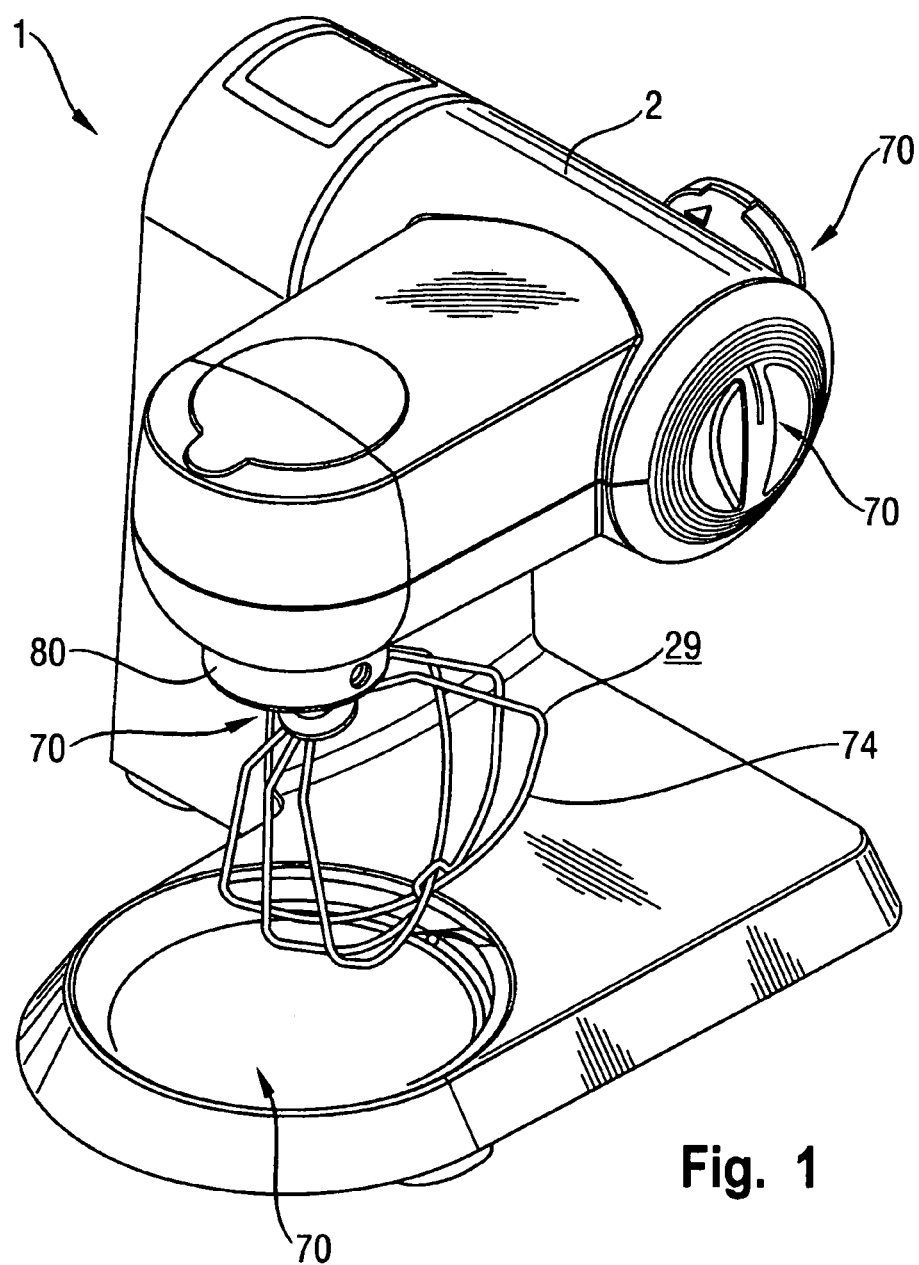
FIG. 1 shows a kitchen appliance according to the invention in a perspective oblique view laterally from above.

FIG. 1 shows a kitchen appliance 1 according to the invention in a perspective oblique view laterally from above with an appliance housing 2 and four different receivers 70 for a tool 29 which may be designed as mixers 74. In this case, three of the four receivers 70 may be driven by the electric motor 3 (see FIGS. 2 to 6).

Figure 2:
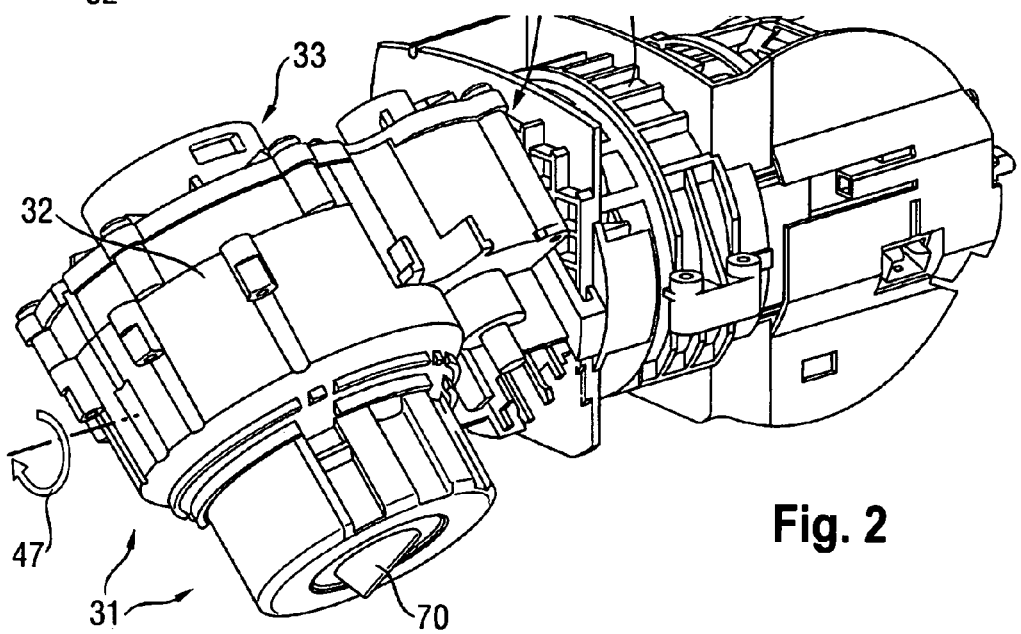
FIG. 2 shows an electric motor-gear stage arrangement of the kitchen appliance according to the invention in a perspective oblique view when connecting the electric motor to a gear stage.

FIG. 2 shows an electric motor-gear stage arrangement 31 of the kitchen appliance 1 according to the invention during preassembly in a perspective oblique view, a gear stage 33 being connected to the electric motor 3, by a gear case 32 and a motor housing 4 being connected to one another by a bayonet lock 34, by the gear case 32, rotated at an angle, being placed on the motor housing 4 and being fixed by rotation in one rotational direction 47. As a result of the bayonet lock 34, a simple but reliable connection of the gear stage 33 to the electric motor 3 is possible by means of a twist-and-plug movement.

Figure 3:
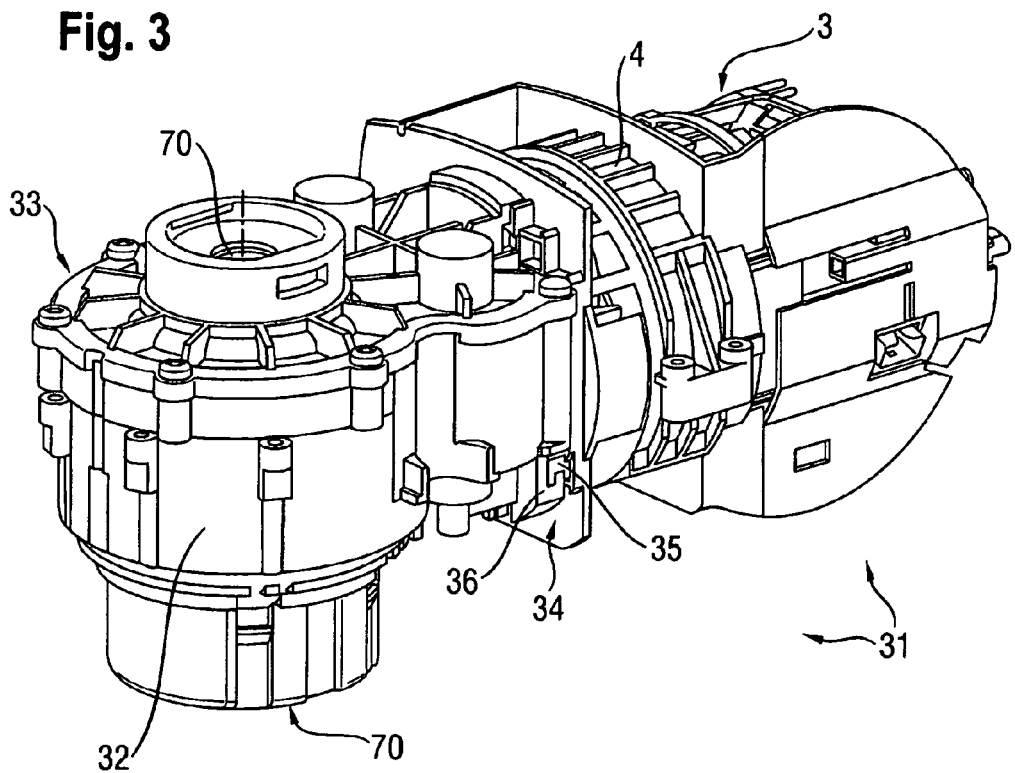
FIG. 3 shows the electric motor-gear stage arrangement according to FIG. 2 after the completed preassembly.

FIG. 3 shows the electric motor-gear stage arrangement 31 according to FIG. 2 in perspective view, the gear stage 33 being fastened by the bayonet lock 34 to the electric motor 3, by a first bayonet lock part 35 on the electric motor 3 being engaged in a corresponding second bayonet lock part 36 of complementary design on the gear stage 33.

Figure 4:
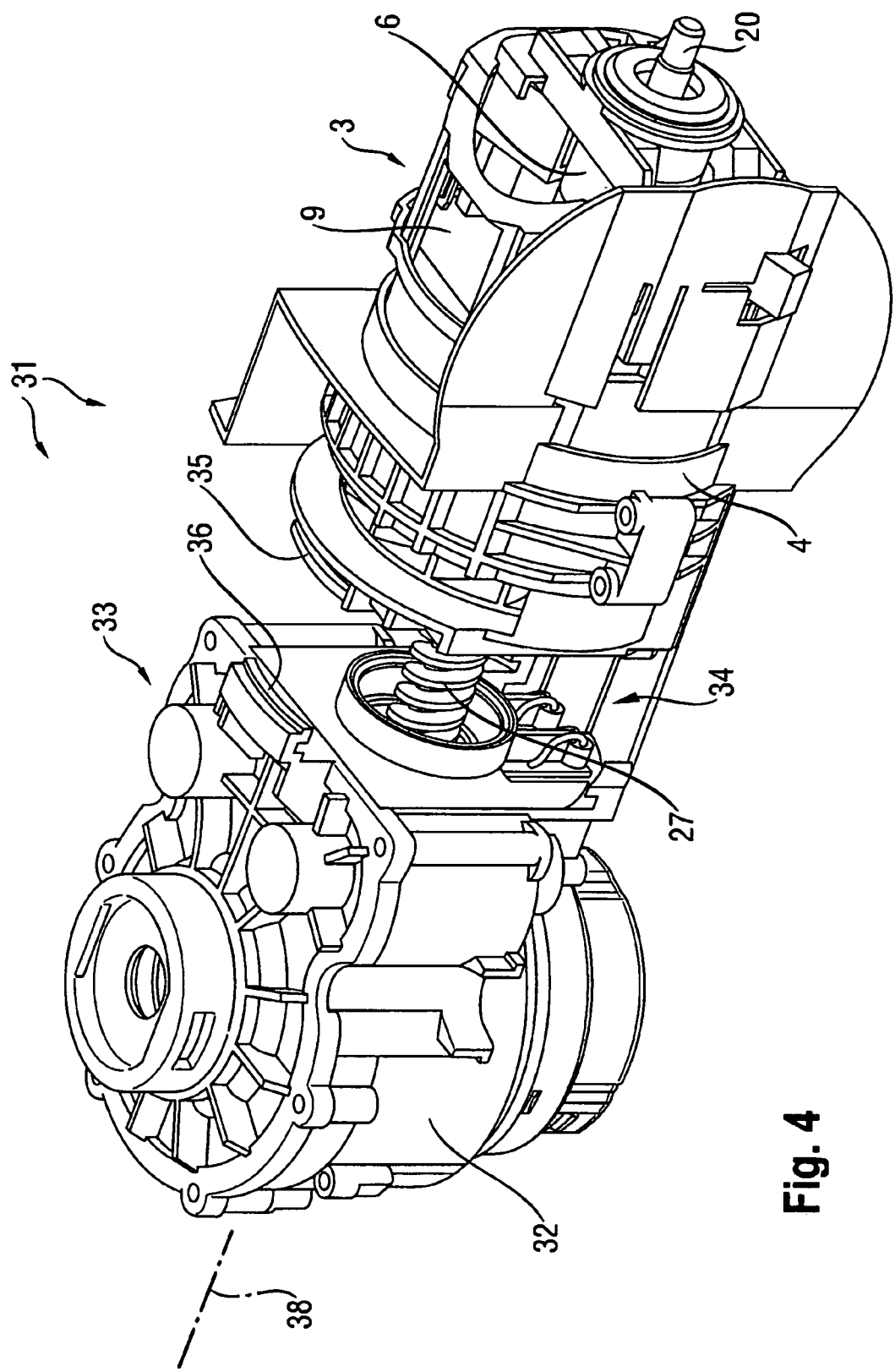
FIG. 4 shows the electric motor-gear stage arrangement according to FIGS. 2 and 3 before assembling the electric motor to the gear stage.

FIG. 4 shows a further electric motor-gear stage arrangement 31 of the kitchen appliance 1 according to the invention in the state immediately before preassembly in a perspective oblique view, the electric motor 3 and the gear stage 33 being pushed together along a connecting line 38, whilst a gearing worm 27 of the electric motor 3 penetrates the inside of the gear stage 33, by rotating the gear stage 33 relative to the electric motor about the connecting line 38, the first bayonet lock part 35 on the electric motor 3 engaging in the second bayonet lock part 36 on the gear stage 33.

Figure 5:
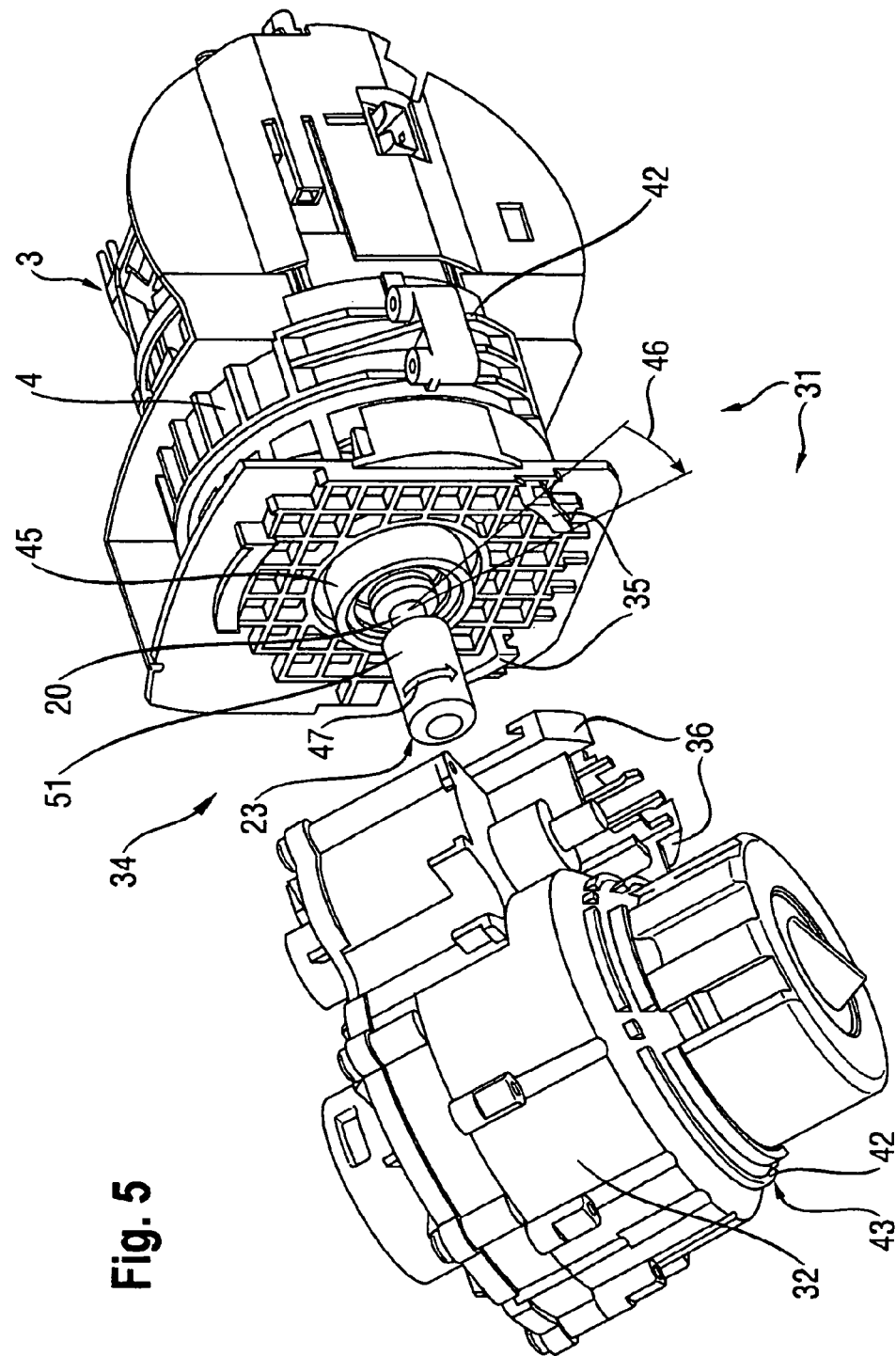
FIG. 5 shows a further electric motor-gear stage arrangement for a kitchen appliance according to the invention before preassembly of the electric motor to the gear stage.

FIG. 5 shows an electric motor-gear stage arrangement 31 of the kitchen appliance according to the invention before it is assembled. For locking the bayonet lock 34, the gear case 32 is rotated relative to the motor housing 4 about a locking angle 46 of 30°, so that the first bayonet lock parts 35 located on the motor housing 4 come into engagement with the second bayonet lock parts 36 located on the gear case 32. On a motor shaft 20 is located a gear element 23 configured as a first helical gear 51, which rotates during operation of the electric motor 3 in the rotational direction 47, so that the rotation of the motor shaft 20 fixes the bayonet lock 34 during operation. The gear case 32 and/or the motor housing 4 comprise mating connecting elements 42, which are configured as connecting receivers 43, in order to receive a reinforcement frame 37 (see FIG. 6) with corresponding connecting projections 41. By means of the reinforcement frame 37, the gear case 32 is additionally stabilized relative to the motor housing 4.

Figure 6:
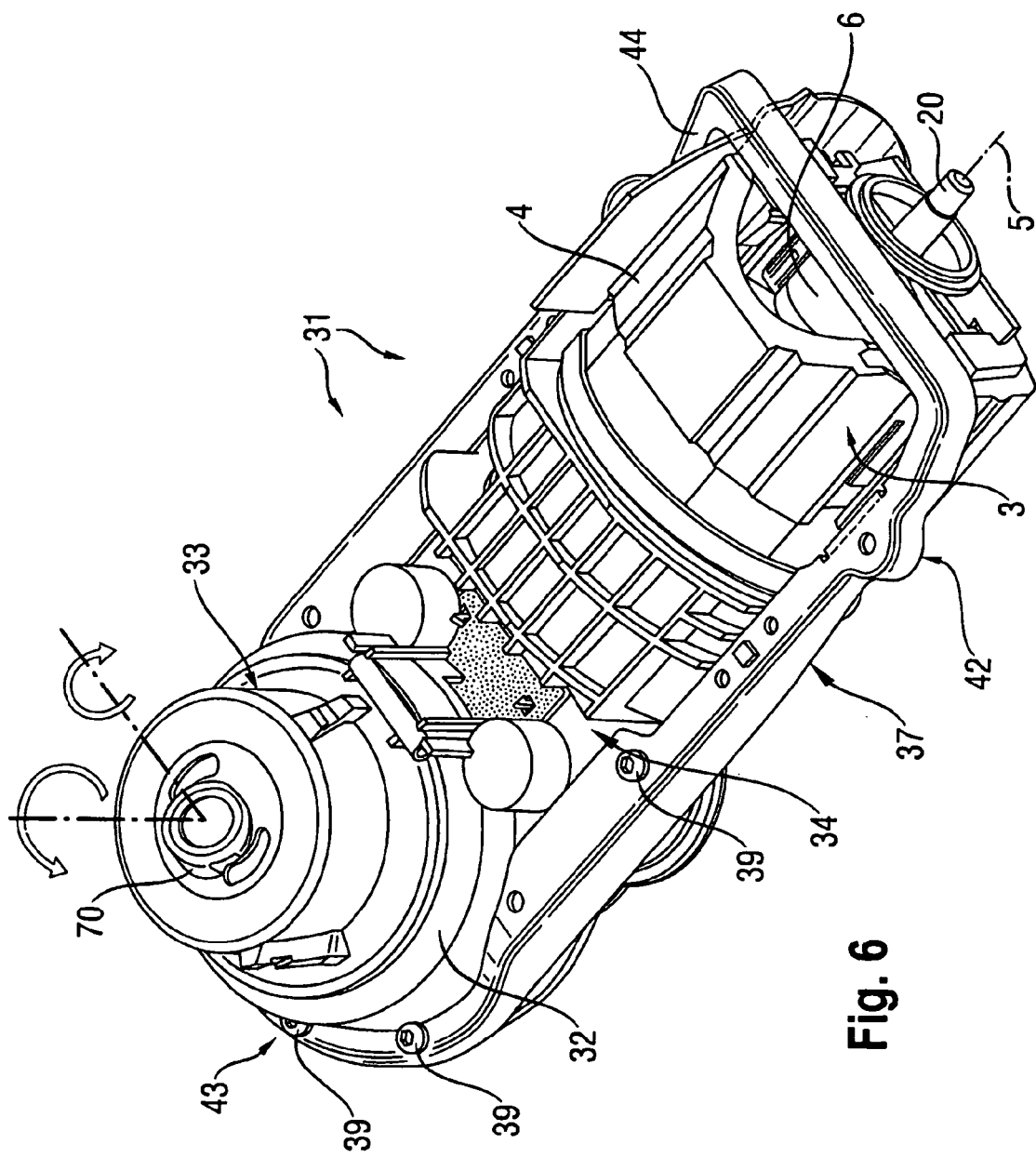
FIG. 6 shows an electric motor-gear stage arrangement according to FIGS. 2 to 5 with the reinforcement frame.

FIG. 6 shows the electric motor-gear stage arrangement 31 according to FIG. 5 in the preassembled state in a perspective oblique view, the reinforcement frame 37 additionally reinforcing the gear stage 33 and the electric motor 3 relative to one another against torsion. The reinforcement frame 37 is screwed, by means of screws 39, to the motor housing 4 and/or the gear case 32. To this end, the reinforcement frame 37 which has an L-shape, is fixed by means of connecting receivers 43 to the motor housing 4 and/or to the gear case 32. The reinforcement frame 37 is configured as an L-shaped profile. The rotation of the motor shaft 20 of the electric motor 3 about the motor rotational axis 5 acts in the locking direction of the bayonet lock 34 so that the gear stage 33, even under heavy load, is not able to be released from the electric motor 3. The gear stage 33 comprises a receiver 70 which may receive a tool 29, such as for example a mixer 74.

Figure 7:
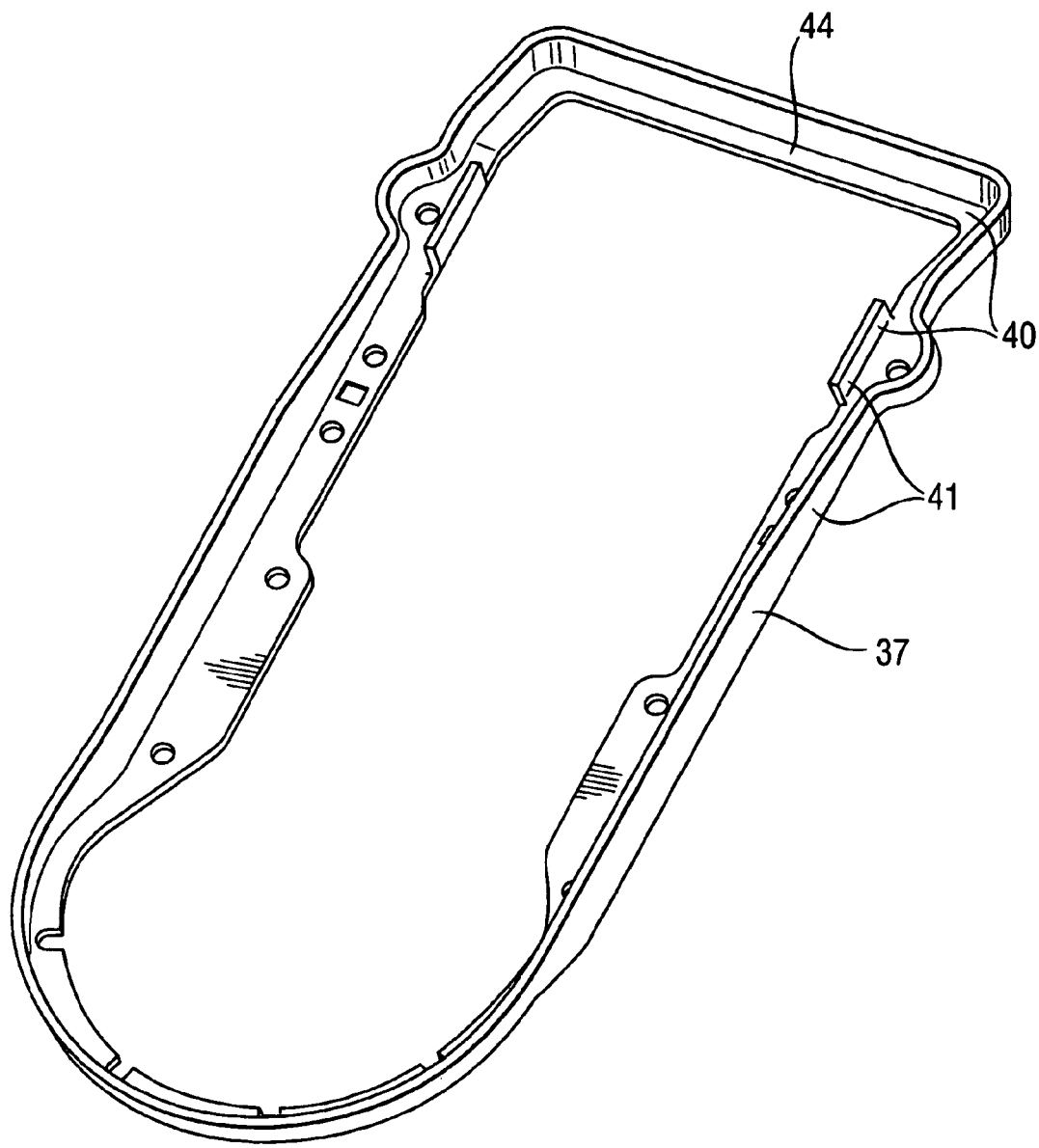
FIG. 7 shows the reinforcement frame according to FIG. 6.

FIG. 7 shows the reinforcement frame 37 according to FIG. 6 in a perspective oblique view. The reinforcement frame 37 is configured as an L-shaped profile 44 with corresponding connecting elements 40 as well as connecting projections 41, so that it may be fastened to the gear case 32 and/or the motor housing 4, for which only few screws 39 are required. By means of the reinforcement frame, torques of the electric motor 3 of approximately 20 Nm may be absorbed. As a result, a particularly rigid construction is produced, which allows a preassembly of the electric motor-gear stage arrangement 31, so that testing and specifying the electric motor-gear stage arrangement 31 may take place before installation in an appliance housing 2 of the kitchen appliance 1.

Figure 8:
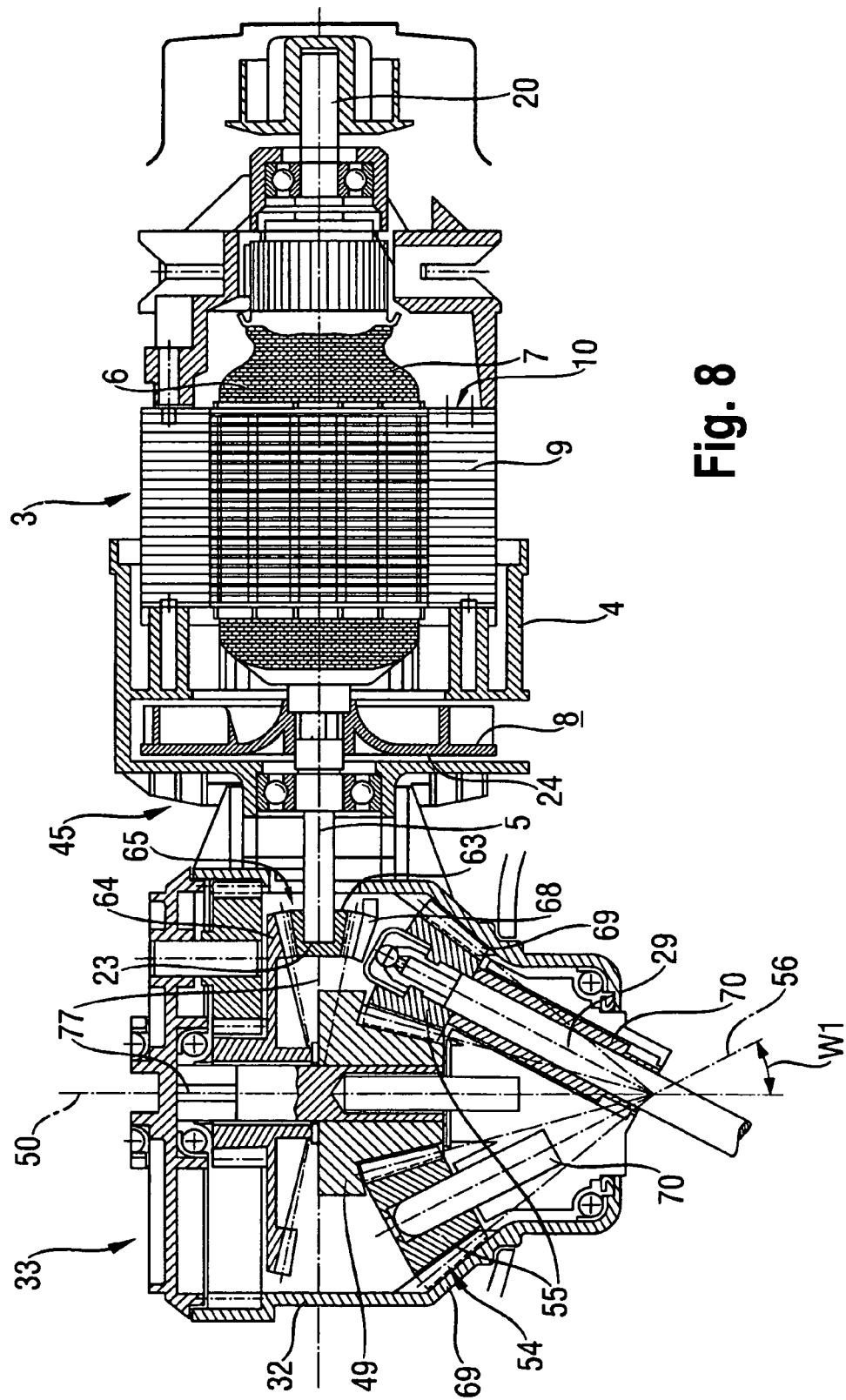
FIG. 8 shows a longitudinal section through the electric motor-gear stage arrangement according to one of FIGS. 2 to 6 with a vertical sectional plane.

FIG. 8 shows a longitudinal section through an electric motor-gear stage arrangement 31 with a vertical sectional plane. The electric motor 3 comprises the motor housing 4 in which a stator 9 with corresponding stator windings 10 and a rotor 6 movable therein with corresponding rotor windings 7 are arranged. A cooling wheel 24 which is configured as a fan impeller 8 is located on the motor shaft 20. By the design of the cooling wheel 24, in particular the thickness of the material used, as well as the thermal properties of the material used, heat produced on the rotor windings 7 and/or in the gear stage 33 may also be discharged by heat conduction. On the motor shaft 20 a gear element 23 has a fixed connection as regards rotation, which as a first bevel gear 23 forms, together with a second bevel gear 64 of the gear stage 33, a bevel gear set 65. By means of the second bevel gear 64, a sun wheel 49 of a planetary gear set 54 is set in rotation, which in turn is in engagement with three planet wheels 55, which in turn run on a ring gear 49. By the rotation of the motor shaft 20, the planet wheels 55 are rotated both about their respective planet wheel axes 56 and also about a sun wheel axis 50, so that a tool 29 inserted into a receiver 70 of the planet wheel 55 carries out a rotational movement on a cone. The sun wheel axis 50 is perpendicular to the motor rotational axis 5. The gear shafts 77 of the bevel gear set 65 are located substantially perpendicular to one another. In this case, the motor rotational axis 5 is substantially coplanar in a plane with the sun wheel axis 50. The angle W1 defined by the planet wheel axis 56 and the sun wheel axis 50 is approximately 30°.

Figure 9:
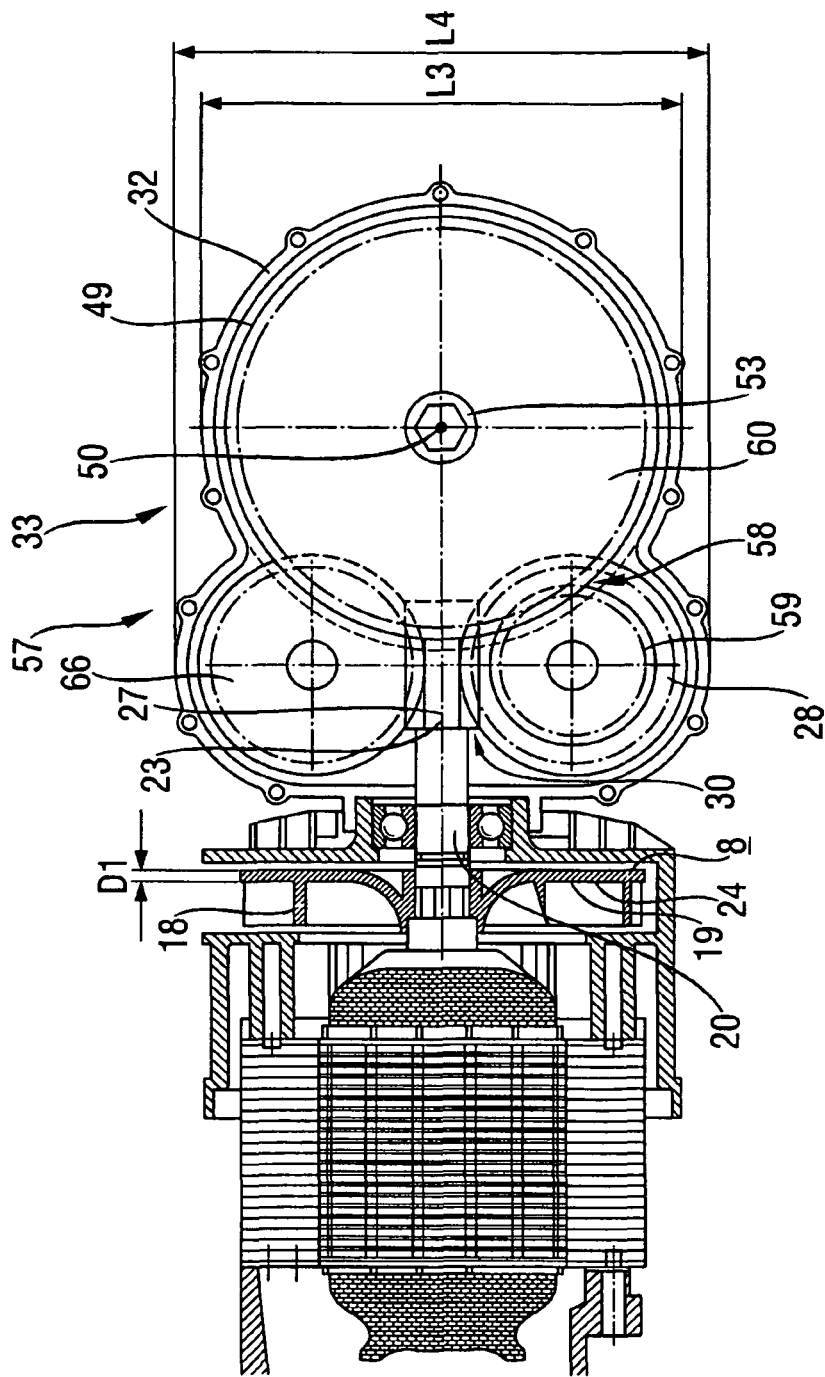
FIG. 9 shows a longitudinal section of the electric motor-gear stage arrangement according to one of FIGS. 2 to 6 or 8 in a longitudinal section with a horizontal sectional plane.

FIG. 9 shows an electric motor-gear stage arrangement 31 of the kitchen appliance 1 according to the invention in a longitudinal section with a horizontal sectional plane and shows a gear stage 33 which has a worm gear set 30 and a spur gear set 58. On the motor shaft 9, a gearing worm 27 has a fixed fastening as regards rotation which comes into engagement with a worm gear 28, which has a fixed connection as regards rotation to a first spur gear 59. Opposite the worm gear, relative to the gearing worm 27, a mating gear 66 is arranged which is in engagement with the gearing worm 27 and absorbs counter forces. The first spur gear 59 is in engagement with a second spur gear 60 which has a fixed connection as regards rotation via a sun wheel shaft 53 to the sun wheel 49. Whilst the worm gear has a gear ratio of substantially 1:1, with the spur gear set 58 a reduction ratio of 4:1 is achieved. The length L3 is between 80 and 100 mm. The length L4 is between 90 and 120 mm. By means of the cooling wheel 6, heat generated on the gearing worm 27 may be guided by heat conduction, by the generated heat being dissipated in the inside of the motor shaft 20 onto the cooling wheel 24. The cooling wheel has a wide base and a large thickness D1 in order to keep heat transfer resistances and heat conduction resistances as low as possible. As a result, an additional cooling of the worm gear set 30 is superfluous. The cooling wheel 24 has, moreover, fan blades 18 which assist the cooling.

Figure 10:
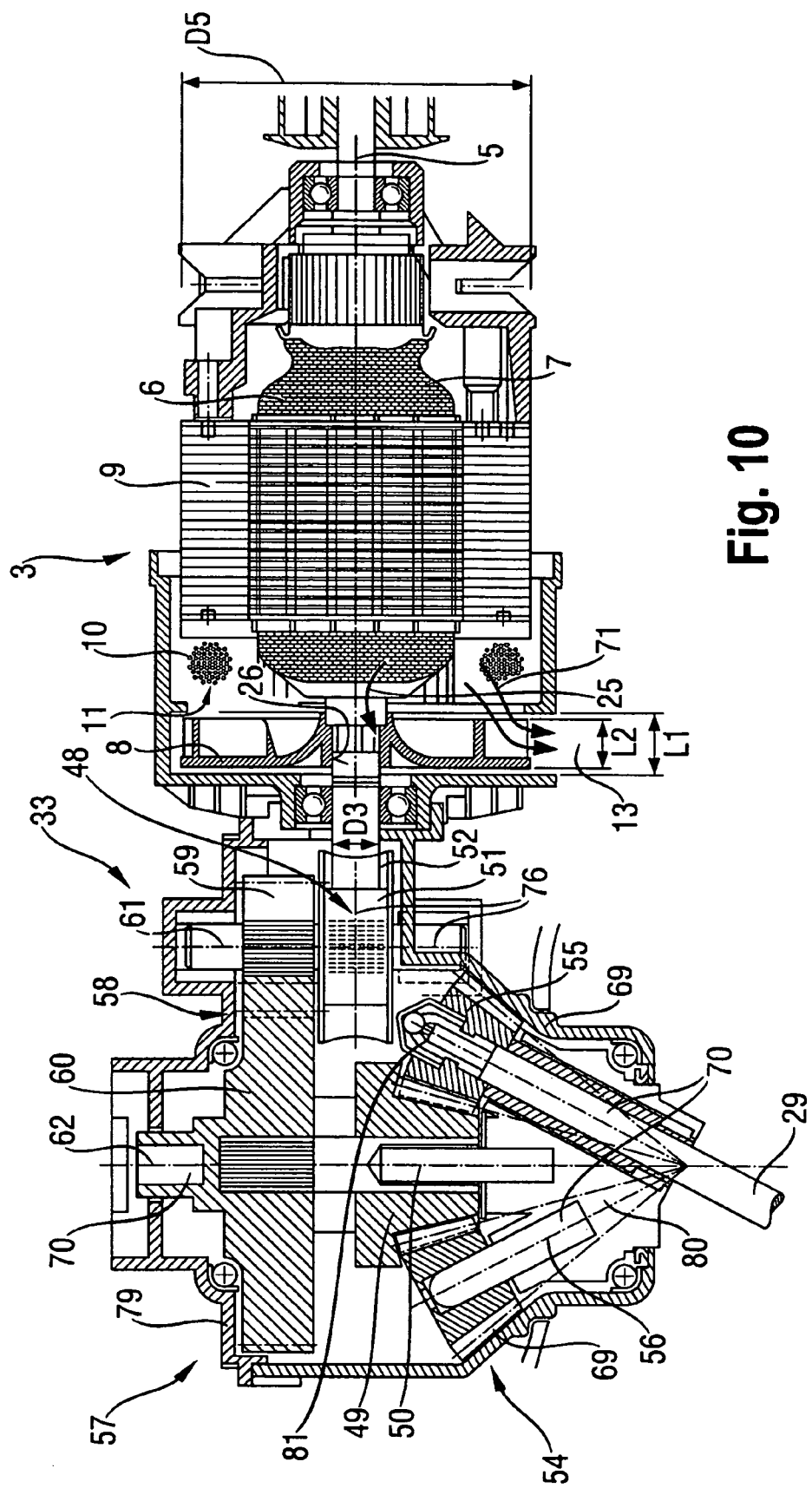
FIG. 10 shows a further embodiment of an electric motor-gear stage arrangement of the kitchen appliance according to the invention in longitudinal section with a vertical sectional plane.

FIG. 10 shows an electric motor-gear stage arrangement 31 of the kitchen appliance according to the invention with a spur gear set 58 and a helical gear set 48 as a gear stage 33, the helical gear set 48 comprising a first helical gear 51 which is fastened to the motor shaft 20 and a second helical gear 52 which has a fixed connection to a first spur gear 59 as regards rotation. The first spur gear 59 is in engagement with a second spur gear 60 which is fastened to a second spur gear shaft 62 and has a fixed connected to the sun wheel 49 as regards rotation. The second spur gear shaft 62 is substantially parallel to a first spur gear shaft 61 of the first spur gear 59. The second spur gear shaft 62 comprises a receiver 70 for a tool 29. In order to insert said tool into the receiver 70, a housing cover 79 has to be lifted. The spur gear set 58 and the helical gear set 48 form a rotation-transmitting connection for the planetary gear set 54 which comprises the sun wheel 49, three planet wheels 55 and a ring gear 69. The sun wheel 49, the planet wheels 55 and the ring gear 69 are conical, so that with a rotation of the motor shaft 20 a tool 29 which is inserted into a receiver 70 of the planet wheels 55, rotates about a planet wheel axis 56, which in turn rotates about a sun wheel axis 50 on a cone. Due to the conical shape of the sun wheel 49, the planet wheels 55 and the ring gear 69, the tool 29 carries out a wobble motion, the wobble motion running on a cone with an angle of opening of approximately 60°. The tool 29 may be inserted into the receiver 70 of a planet wheel 55 and may be arrested by means of a tool lock 81. The helical gear set 48 comprises gear shafts 76 substantially perpendicular to one another. The electric motor 3 has a rotor 6 which bears rotor windings 7 which are cooled by the cool air 71 generated by the fan impeller 8. A stator 9 of the electric motor 3 comprises stator windings 10 which oppose the fan impeller 8 in a free manner, i.e. without an obstruction located therebetween. As a result, the cool air 71 may directly come into contact with an end winding 11 of the stator winding 10. The motor housing 4 comprises outlet openings 13 for the cool air 71 which have a length L1 which corresponds approximately to the axial length L2 of the fan impeller 8. The thickness of the fan impeller 8 is 30% of the diameter D3 of the motor shaft 20 and carries out an efficient discharge of heat from the motor shaft 20 and toward radially outwardly located regions of the fan impeller 8. The diameter D5 of the cooling wheel 64 substantially corresponds to the diameter of the stator windings 10 in a plane perpendicular to the motor rotational axis 5. Cool air is delivered, in particular, from inside, by means of the fan impeller 8, out of the motor housing to the outside.

FIG. 11 shows a rotation-transmitting connection 57 with a spur gear set 58 and a worm gear set 30 in cross section along a vertical sectional plane perpendicular to the motor rotational axis 5. A gearing worm 27 engages in a worm gear 28 which has a fixed connection as regards rotation via a gear shaft 75 to a first spur gear 59, which in turn engages in a second spur gear 60 (not shown). A worm mating gear 66 absorbs counter forces so that the gearing worm 27 may not be disengaged clockwise. A mixer 74 may be positioned on the appliance top 80 (see FIG. 1).

FIG. 12 shows a further embodiment of the gear stage 33 with a spur gear set 58 and a helical gear set 48, a first helical gear 28 coming into engagement with a second helical gear 52, which has a fixed connection as regards rotation to a first spur gear 59, which is in engagement with a second spur gear 60. Relative to the first helical gear 51, a helical gear 67 is arranged opposite the second helical gear 52, in order to be able to absorb counter forces.

Figure 13:
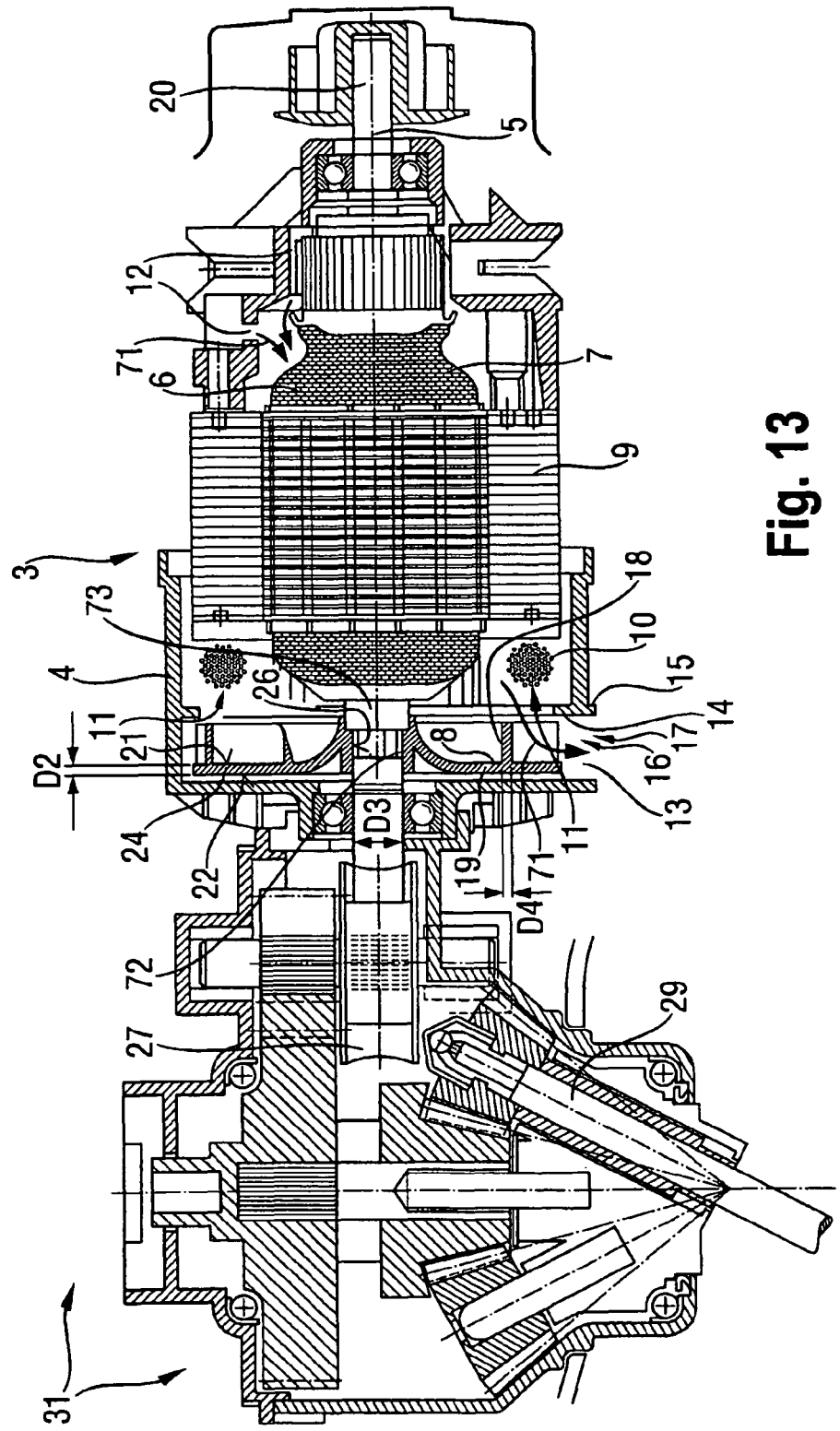
FIG. 13 shows a longitudinal section through an electric motor-gear stage arrangement of a kitchen appliance according to the invention with a vertical sectional plane.

FIG. 13 shows a further embodiment of the electric motor-gear stage arrangement 31 in longitudinal section with a vertical sectional plane, a cooling wheel 24 being fastened to the motor shaft 20 and which is connected by an efficient heat-conducting contact surface 26 to the motor shaft 20, in order to keep the heat transmission resistance 72 as low as possible. Heat which is formed on the gearing worm 27 or in the rotor windings 7 of the rotor 6, is forwarded in the motor shaft 20 which has a heat conduction resistance 73 which is as low as possible, via the contact surfaces 26, to the cooling wheel 24, which is easily able to absorb the heat due to its considerable wall thickness D2 and may efficiently convey the heat into radially outwardly located regions of the cooling wheel 24. The cooling wheel 24, moreover, comprises fan blades 18 which during the rotation of the motor shaft 20 generate a cool air flow 71. The cool air flow 71 cools, on the one hand, the cooling wheel 24 and thus helps to dissipate the heat transported via heat conduction. Moreover, the cooling wheel 24 generates cool air 71 which flows directly past an end winding 11 of a stator winding 10 of the stator 9 and thus also cools the stator 9. The motor housing 4 comprises inlet openings 12 for cool air 71 as well as outlet openings 13. The outlet openings comprise a first 14 and a second 15 edge which are formed projecting inwardly and/or outwardly, whereby a first flow channel 16 and a second flow channel 17 are produced, which assist an acceleration of the cool air 71 and thus positively effect the cooling of the electric motor 3. The cooling wheel 24 is configured as a fan impeller 8, by the fan blades 18 being attached to a support plate 19. The fan impeller 8 is produced by injection-molding. The wall thickness D4 of the fan blades 18 is approximately 20% of the diameter D3 of the motor shaft 20. The contact surface 26 corresponds approximately to the cross-sectional area of the motor shaft 20. As a result of such a design of the fan impeller 8, efficient heat discharge of the heat generated in the gearing worm 27 and/or in the rotor windings 7 is effected. The heat is discharged via the fan impeller 8 so that overall a particularly easy and efficient heat discharge is achieved even when the kitchen appliance 1 is under high load.

Various other aspects which are associated with the invention are disclosed hereinafter. The individual aspects may respectively be applied separately, i.e. independently of one another, or combined with one another in any manner.

A particularly advantageous electric motor 3 for an electric motor-driven kitchen appliance 1, in particular for an electric motor-driven single- or multipurpose kitchen appliance, comprising a motor housing 4 in which a rotor 6 which is rotationally movable along a motor rotational axis 5, with a fan impeller 8 having a fixed connection thereto as regards rotation, is arranged, as well as a stator 9 with a stator winding 10, the stator winding 10 comprising an end winding 11 which extends parallel to a direction of the motor rotational axis 5 toward the fan impeller 8, is characterized in that the end winding 11 and the fan impeller 8 oppose one another in a free manner. In one embodiment, the electric motor 3 is an arc motor. In a further embodiment, the electric motor 3 is a capacitor motor. In a further embodiment the electric motor 3 is a split-pole motor. In one embodiment the motor housing 4 comprises inlet openings 12 and outlet openings 13 for cool air 71 supplied by the fan impeller 8 and the length L1 of the outlet openings 13 in the direction of the motor rotational axis 5 corresponds substantially to the axial length L2 of the fan impeller 8. In a further embodiment, the motor housing 4 comprises outlet openings 13 for cool air 71 supplied by the fan impeller 8, which comprise a first edge 14 projecting inwardly into the motor housing 4, which serves as a first flow channel 16 for accelerating the cool air 71. Moreover, the motor housing 4 may comprise outlet openings 13 for cool air 71 supplied by the fan impeller 8, which comprise a second edge 15 projecting outwardly, which serves as a second flow channel 17 for accelerating the cool air 71. In a development of the invention, the fan impeller 8 comprises fan blades 18 and comprises a support plate 19 arranged perpendicular to the motor rotational axis 5, with a first 21 and a second 22 plate surface, the fan blades 18 being fastened to the support plate 19. In a further development of the invention, the fan blades 18 are arranged together on the first plate surface 21, in particular arranged in a manner which has efficient heat conduction, which in particular face toward the stator winding 10. In a specific embodiment, the maximum nominal rotational speed of the electric motor 3 is in a range of 8,000 to 20,000 revolutions per minute, in particular in a range of 10,000 and 15,000 revolutions per minute. The maximum attainable electrical nominal power of the electric motor 3 may be in a range of 200 W to 1,200 W, in particular in a range of 600 W to 900 W.

A particularly advantageous electric motor-driven kitchen appliance 1, in particular an electric motor-driven single- or multipurpose kitchen appliance, comprises the electric motor 3 according to the invention.

A particularly advantageous electric motor-driven kitchen appliance 1, in particular an electric motor-driven single- or multipurpose kitchen appliance, comprising an electric motor 3 which comprises a stator 9 and a rotor 6 which is rotationally movable on a motor shaft 20, the rotor 6 comprising rotor windings 7 and the motor shaft 20 receiving a gear element 23 in particular a gearing worm 27 or a first helical gear 51, is characterized in that a metallic cooling wheel 24, having a fixed connection as regards rotation to the motor shaft 20, is provided for cooling the rotor windings 7 and/or for cooling the gear element 23. Advantageously, the cooling wheel 24 and the rotor 6 are connected via the motor shaft 20 in a heat conducting manner, such that during operation at nominal maximum power of the electric motor 3 at least 20%, in particular at least 30%, preferably at least 40% of the heat generated by the rotor windings 7, is discharged via heat conduction to the cooling wheel 24. In particular the cooling wheel 24 and the gear element 23 are connected in a heat conducting manner such that during operation at nominal maximum power of the electric motor 3 at least 60%, in particular at least 75%, preferably at least 90% of the heat output introduced into the gear element 23 is discharged via heat conduction to the cooling wheel 24. In one embodiment, a wall thickness D2 of the cooling wheel 24 is at least 20%, in particular at least 25%, preferably at least 30% of the diameter D3 of the motor shaft 20 and, in particular, in a range of 1.5 mm to 5 mm. In a development of the invention, the sum of the heat transmission resistances 72 along the heat conducting path 25, namely the rotor winding-rotor-motor shaft-cooling wheel 24, is less than the sum of the heat conducting resistances 73 between the rotor windings 7 and the cooling wheel 24, in particular less than 50%, preferably less than 30%, particularly preferably less than 10%. The cooling wheel 24 and the motor shaft 20 may be connected at a contact surface 26, which is at least 40%, in particular at least 50%, preferably at least 60% of the external peripheral surface of a hollow cylinder with a diameter equal to the diameter D3 of the motor shaft 20 and a length equal to the diameter D3 of the motor shaft 20. Advantageously, the cooling wheel 24 is arranged along the motor shaft 20 between the rotor windings 7 and the gear element 23. The gear element 23 may be a gearing worm 27. In one embodiment, the cooling wheel 24 may be designed as a fan impeller 8 and may comprise in particular fan blades 18, the wall thickness D4 thereof preferably being at least 15%, particularly preferably at least 20%, of the diameter D3 of the motor shaft 20. Advantageously the cooling wheel 24 comprises a support plate 19 arranged perpendicular to the motor rotational axis 5 with a first 21 and a second 22 plate surface, the fan blades 18 being fastened to the support plate 19 and, in particular, the thickness D1 of the support plate 19 being at least 20%, preferably at least 30%, of the diameter D3 of the motor shaft 20. Advantageously, the diameter D5 of the cooling wheel 24 corresponds substantially to that of the stator 9. In a specific embodiment, the cooling wheel 24 consists of aluminum or an aluminum-zinc alloy. The cooling wheel 24 may be produced by casting or forging. In one embodiment, a tool 29, in particular a pureeing tool, mixing tool, chopping tool, kneading tool and/or cutting tool, a whisk and/or mixer 74, a blender, a continuous shredder, a grain mill, a citrus press and/or juicer and/or a mince may be inserted into the kitchen appliance 1.

A particularly advantageous arrangement of a worm gear set 30 comprises a worm gear 28, a gearing worm 27, a motor shaft 20 and a cooling wheel 24, the worm gear 28 coming into engagement with the gearing worm 27 having a fixed connection to the motor shaft 20 as regards rotation and the cooling wheel 24 having a fixed connection to the motor shaft 20 as regards rotation and is characterized in that the cooling wheel 24 is metallic and in that during operation at nominal maximum power at least 60%, in particular at least 75%, preferably at least 90% of the heat generated on the worm gear set 30 is discharged to the cooling wheel 24 via heat conduction. The cooling wheel 24 may be a fan impeller 8.

A particularly advantageous electric motor-driven kitchen appliance 1, in particular an electric motor-driven single- or multipurpose kitchen appliance, comprising an insert able electric motor-gear stage arrangement 31 which comprises an electric motor 3 comprising a motor housing 4 and a gear stage 33 comprising a gear case 32 fastened thereto, is characterized in that the arrangement 31 has a positionable reinforcement frame 37, which extends around the motor housing 4 and the gear case 32. In one embodiment, the reinforcement frame 37 creates a substantially torsion-proof connection along the connecting line 38 between the electric motor 3 and the gear stage 33, the torsion-proof connection being able to absorb, in particular, torques in a range of 3 Nm to 100 Nm, preferably a range of 5 Nm to 50 Nm, particularly preferably a range of 10 Nm to 20 Nm. The reinforcement frame 37 may be produced from metal, in particular by stamping and pressing or by injection-molding. The reinforcement frame 37 may be screwed, by means of fewer than ten screws 39, in particular fewer than six screws, preferably only one screw, to the gear case 32 and/or to the motor housing 4. Advantageously, the gear case 32 and the motor housing 4 and/or the reinforcement frame 37 comprise connecting elements D1, in particular connecting projections 41, preferably a peripheral spring, and mating connecting elements 42, in particular connecting receivers 43, preferably a peripheral groove, by which a threadless fastening of the reinforcement frame 37 to the gear case 32 and/or to the motor housing 4 is effected. The reinforcement frame 37 may have a U-shaped or L-shaped profile 44. Advantageously, a tool 29, in particular a pureeing tool, mixing tool, chopping tool, kneading tool and/or cutting tool, a whisk and/or mixer 74, a blender, a continuous shredder, a grain mill, a citrus press and/or juicer and/or a mince may be attached to the kitchen appliance 1. The motor housing 4 and/or the gear case 32 may also be produced from plastics, in particular from glass fiber-reinforced plastics. The gear case 32 and the motor housing 4 may be connected to one another by means of a screw flange 45, in particular by means of a bayonet lock 34.

A particularly advantageous method for producing a kitchen appliance 1, in particular a kitchen appliance 1 according to the invention, which comprises an appliance housing, an electric motor 3 comprising a motor housing 4, and a gear stage 33 comprising a gear case 32, provides that for preassembly, the motor housing 4 is connected to the gear case 32 by forming an electric motor-gear stage arrangement 31 such that a motor shaft 20 of the electric motor 3 has a fixed connection to a gear shaft of the gear stage 33 in terms of rotation and a reinforcement frame 37 is positioned around the gear case 32 and the motor housing 4, so that the gear case 32 is connected in a torsion-proof manner to the motor housing 4; and in that, subsequently, the preassembled electric motor-gear stage arrangement 31 is installed in the appliance housing 2. The reinforcement frame 37 may be fastened by fewer than ten screws 39, in particular fewer than six screws, preferably by only one screw, to the motor housing 4 and/or gear case 32. Advantageously, the reinforcement frame 37 is clipped to the motor housing 4 and/or to the gear case 32. Advantageously, the electric motor-gear stage arrangement 31 is tested and/or specified before installation in the appliance housing 2.

A particularly advantageous electric motor-driven kitchen appliance 1, in particular an electric motor-driven single- or multipurpose kitchen appliance, comprising an electric motor 3 and a gear stage 33, the electric motor 3 comprising a motor housing 4 and the gear stage 33 comprising a gear case 32, is characterized in that the motor housing 4 and the gear case 32 are connected to one another by means of a bayonet lock 34. The motor housing 4 may be made of glass fiber-reinforced plastics or injection-molded material. The gear case 32 may also be made of glass fiber-reinforced plastics or injection-molded material. The bayonet lock 34 has, in particular, a locking angle 46 of less than 180°, in particular less than 90°, preferably less than 45°. In one embodiment, the electric motor 3 has a single rotational direction 47 which acts in the closing direction of the bayonet lock 34 and causes self-locking of the bayonet lock 34 during operation. Advantageously, a rotationally fixed connection of a motor shaft 20 of the electric motor 3 with a gear shaft 75 of the gear stage 33 is produced by means of a worm gear set 30. The worm gear set 30 may comprise a gearing worm 27 on the motor side, and at least one worm gear 28 on the gear side, preferably two worm gears on the gear side, opposing the gearing worm 27. Advantageously, the motor housing 4 and the gear case 32 are additionally fixed to one another by a reinforcement frame 37. In one embodiment, the bayonet lock 34 comprises a lock rotational axis, which substantially coincides with a motor rotational axis 5. Advantageously, the kitchen appliance 1 comprises an appliance housing 2, in which the electric motor 3 connected to the gear stage 33 may be inserted.

A particularly advantageous electric motor comprises a first bayonet lock part 35 for the kitchen appliance 1 according to the invention.

A particularly advantageous gear stage 33 comprises a second bayonet lock part 36 for a kitchen appliance 1.

A particularly advantageous method for assembling an electric motor-driven kitchen appliance 1, in particular of the kitchen appliance 1 according to the invention, comprising an electric motor 3 and a gear stage 33, the electric motor 3 comprising a motor housing 4 and the gear stage 33 comprising a gear case 32, is characterized by the following method steps: preassembling the electric motor 3 in the motor housing 4, preassembling the gear stage 33 in the gear case 32, connecting the motor housing 4 and the gear case 32 by means of a bayonet lock 34 such that a motor shaft 20 of the electric motor 3 has a fixed connection to a gear shaft 75 as regards rotation. Advantageously, the twist-and-plug motion of the locking of the bayonet lock 34 substantially takes place around the motor shaft 20.

A particularly advantageous electric motor-driven kitchen appliance 1, in particular an electric motor-driven single- or multipurpose kitchen appliance, comprising a planetary gear set 54 which comprises at least one planet wheel 55 with a planet wheel axis 56 and a sun wheel 49 with a sun wheel axis 50 and an electric motor 3 with a motor shaft 20 which extends along a motor rotational axis 5, the motor shaft 20 and the planetary gear set 54 being coupled to one another by a rotation-transmitting connection 57, is characterized in that the rotation-transmitting connection 57 comprises a spur gear set 58 with a first 59 and a second 60 spur gear and/or a bevel gear set 65 with a first 63 and a second 64 bevel gear. In one embodiment, the spur gear set 58 and/or the bevel gear set 65 have a gear ratio in a range of 10 to 40, in particular in a range of 20 to 30. In a development of the invention, the rotation-transmitting connection 57 comprises a worm gear set 30 with a gearing worm 27 and a worm gear 28 or a helical gear set 48 with a first 51 and a second 52 helical gear, the worm gear set 30 and/or the helical gear set 48 having a gear ratio in a range of 0.5 to 4, in particular in a range of 1 to 2. The gearing worm 27 and/or the first helical gear 51 may be positioned on the motor shaft 20. The sun wheel 49 may comprise a sun wheel shaft 53, on which a second bevel gear is located. In one embodiment, the respective gear shafts 75 of the worm gear set 30, the respective gear shafts 76 of the helical gear set 48 and/or the respective gear shafts 77 of the bevel gear set 65 are substantially perpendicular to one another and/or the respective gear shafts 78 of the spur gear set 58 substantially parallel to one another. The sun wheel axis 50 may be substantially perpendicular to the motor rotational axis 5 and may be coplanar therewith. In a development of the invention, for absorbing counter forces the worm gear set 30 has a worm mating gear 66, the helical gear set 48 has helical mating gear 67 and/or the bevel gear set 65 has a bevel mating gear 68 which, relative to the gearing worm 27, the first helical gear 51 and/or the first bevel gear 63, respectively opposes the worm gear 28, the second helical gear 52 and/or the second bevel gear 64 and comes into engagement with the gearing worm 27, the first helical gear 51 and/or the first bevel gear 63. The planetary gear set 54 may comprise a ring gear 69 coaxially arranged relative to the sun wheel 49. The ring gear 69 may be stationary and may have a fixed connection to an appliance housing 2 of the kitchen appliance 1 as regards rotation. The ring gear 69 may be conical. The planet wheels 55 may be conical. In one embodiment, the planet wheel axis 56 and the sun wheel axis 50 intersect at an angle in a range of 30° to 80°, in particular in a range of 20° to 35°, preferably in a range of 25° to 30°. Advantageously, at least two, in particular three, planet wheels 55 are provided. Advantageously, the planet wheel 55 has a planet wheel axis 56 and the gear ratio between a rotation about the sun wheel axis 50 and a rotation about the planet wheel axis 56 is in a range of 1:1 to 1:10, in particular in a range of 1:2 to 1:5. The electric motor 3 may have a maximum nominal rotational speed in a range of 8,000 revolutions per minute, up to 20,000 revolutions per minute, in particular in a range of 10,000 revolutions per minute, up to 15,000 revolutions per minute. In a particular embodiment the at least one planet wheel 55 has a receiver 70 for a tool 29, in particular a pureeing tool, mixing tool, chopping tool, kneading tool and/or cutting tool and/or a whisk and/or mixer 74.

The invention relates to an electric motor-driven kitchen appliance 1, in particular an electric motor-driven single- or multipurpose kitchen appliance, comprising an electric motor 3 and a gear stage 33, the electric motor 3 comprising a motor housing 4 and the gear stage 33 comprising a gear case 32, the motor housing 4 and the gear case 32 being connected to one another by means of a bayonet lock 34; an electric motor 3 as well as a gear stage 3 with corresponding bayonet locking parts, which are suitable and intended for the kitchen appliance according to the invention; and a method for assembling an electric motor-driven kitchen appliance. The invention is characterized by a simplified assembly and/or manufacture of the kitchen appliance, which allows quality control before the complete assembly of the kitchen appliance and thus considerably simplifies the complexity and cost of production.

LIST OF REFERENCE SYMBOLS

1 Kitchen appliance
2 Appliance housing
3 Electric motor
4 Motor housing
5 Motor rotational axis
6 Rotor
7 Rotor windings
8 Fan impeller
9 Stator
10 Stator winding
11 End winding
12 Inlet openings
13 Outlet openings
14 First edge
15 Second edge
16 First flow channel
17 Second flow channel
18 Fan blades
19 Support plate
20 Motor shaft
21 First plate surface
22 Second plate surface
23 Gear element
24 Cooling wheel
25 Heat conducting path
26 Contact surface
27 Gearing worm
28 Worm gear
29 Tool
30 Worm gear set
31 Electric motor-gear stage arrangement
32 Gear case
33 Gear stage
34 Bayonet lock
35 First bayonet lock part
36 Second bayonet lock part 37 Reinforcement frame
38 Connecting line
39 Screws
40 Connecting elements
41 Connecting projections
42 Mating connecting elements
43 Connecting receivers
44 Profile
45 Screw flange
46 Locking angle
47 Rotational direction
48 Helical gear set
49 Sun wheel
50 Sun wheel axis
51 First helical gear
52 Second helical gear
53 Sun wheel shaft
54 Planetary gear set
55 Planet wheel
56 Planet wheel axis
57 Rotation-transmitting connection
58 Spur gear set
59 First spur gear
60 Second spur gear
61 First spur gear shaft
62 Second spur gear shaft
63 First bevel gear
64 Second bevel gear
65 Bevel gear set
66 Worm mating gear
67 Helical mating gear
68 Bevel mating gear
69 Ring gear
70 Receiver
71 Cool air
72 Heat transmission resistance
73 Heat conduction resistances
74 Mixer
75 Gear shafts of the worm gear set 30
76 Gear shafts of the helical gear set 48
77 Gear shafts of the bevel gear set 65
78 Gear shafts of the spur gear set 58
79 Housing cover
80 Appliance top
81 Tool locking
L1 Length of the outlet openings 13
L2 Length of the fan impeller 8
L3, L4 Lengths
D1 Thickness of the support plate 19
D2 Wall thickness of the cooling wheel 24
D3 Diameter of the motor shaft 20
D4 Wall thickness of the fan blades 18
D5 Diameter of the cooling wheel 24
W1 Angle

The invention claimed is:

1. An electric motor-driven kitchen appliance comprising:
a main appliance housing; and
an electric motor-gear stage arrangement provided within the main appliance housing, said arrangement comprising:
an electric motor disposed within a motor housing, wherein the motor housing includes a motor housing end face, and the electric motor includes a motor shaft adapted to rotate about a motor rotational axis;
a gear stage disposed within a gear case, wherein the gear case includes a gear case end face substantially parallel to and facing the motor housing end face, said gear case being separable from the motor housing, the motor housing and the gear case being provided within and separable from the main appliance housing; and
a bayonet lock connecting the motor housing and the gear case, wherein the bayonet lock is positioned within the main appliance housing, the bayonet lock comprising:
a first bayonet lock part on the motor housing end face, the first bayonet lock part being spaced radially outward from the motor rotational axis, the first bayonet lock part including one of a curved tongue and a curved slot, and
a second bayonet lock part on the gear case end face, the second bayonet lock part being spaced radially outward from the motor rotational axis, the second bayonet lock part including the other of the curved tongue and the curved slot;
wherein the bayonet lock is selectively movable between:
a first, unlocked configuration, in which the motor shaft is rotationally interlocked with the gear stage, and the first bayonet lock part is circumferentially aligned with but rotationally offset from the second bayonet lock part with respect to the motor rotational axis, and
a second, locked configuration, in which the motor shaft is rotationally interlocked with the gear stage, and the first bayonet lock part is rotated about the motor rotational axis into rotational alignment with the second bayonet lock part, such that the curved tongue and curved slot are engaged.

2. The kitchen appliance of claim 1, wherein the bayonet lock has a locking angle through which the gear case is turned about the rotational axis relative to the motor housing of less than 180°.

3. The kitchen appliance of claim 1, wherein the bayonet lock has a locking angle through which the gear case is turned about the rotational axis relative to the motor housing of less than 90°.

4. The kitchen appliance of claim 1, wherein the bayonet lock has a locking angle through which the gear case is turned about the rotational axis relative to the motor housing of less than 45°.

5. The kitchen appliance of claim 1, wherein the electric motor is adapted to rotate in only a single rotational direction about the motor rotational axis, and wherein the bayonet lock is adapted to lock in a single locking direction, and wherein the rotation direction of the motor and the locking direction of the bayonet lock are the same so that rotation of the electric motor in the single direction effects locking and/or tightening of the bayonet lock during operation.

6. The kitchen appliance of claim 1, wherein the first bayonet lock part is a curved tongue curved about the motor rotational axis between the motor housing and the gear case, and a second bayonet lock part is a curved slot that receives the curved tongue.

7. The kitchen appliance of claim 1, wherein the motor shaft has a shaft axis that is substantially perpendicular to the motor housing end face.

8. The kitchen appliance of claim 1, wherein the gear case and the motor housing include cooperating screw flanges, each screw flange having an annular shape that projects from the gear case end face and the motor housing end face, respectively, to surround the motor rotational axis, the first and second bayonet parts being positioned radially outward relative to the screw flanges.

9. A method for assembling an electric motor-driven kitchen appliance, comprising the steps of:
assembling an electric motor in a motor housing, wherein the motor housing includes a motor housing end face, the electric motor includes a motor shaft the motor housing includes a first bayonet lock part on the motor housing end face, the first bayonet lock part being spaced radially outward from the motor rotational axis, the first bayonet lock part including one of a curved tongue and a curved slot;

assembling a gear stage in a gear case that is separable from the motor housing, wherein the gear case includes a gear case end face substantially parallel to and facing the motor housing end face, a second bayonet lock part on the gear case end face, the second bayonet lock part being spaced radially outward from the motor rotational axis, the second bayonet lock part including the other of a curved tongue and a curved slot;

positioning the motor housing and gear case such that the motor shaft is engaged with the gear case, and the first bayonet lock part is circumferentially aligned with but rotationally offset from the second bayonet lock part with respect to the motor rotational axis;

rotating the motor shaft about the motor rotational axis against the gear stage, thereby causing the first bayonet lock part to rotate in a locking direction into engagement with the second bayonet lock part, such that the motor housing is connected with the gear case; and positioning the connected motor housing and gear case within a main appliance housing with the first and second bayonet lock parts positioned within the main appliance housing.

10. The method of claim 9, wherein assembly of the electric motor in the motor housing and the assembling of the gear stage in the gear case take place separately on separate assembly lines, whereby quality control takes place before the gear case and motor housing are installed in the main appliance housing.

11. An electric motor-driven kitchen appliance comprising:

a main appliance housing; and an electric motor-gear stage arrangement provided within the main appliance housing, said arrangement comprising:

an electric motor disposed within a motor housing, wherein the motor housing includes a motor housing end face, and the electric motor includes a motor shaft adapted to rotate about a motor rotational axis;

a gear stage disposed within a gear case, wherein the gear case includes a gear case end face substantially parallel to and facing the motor housing end face, said gear case being separable from the motor housing, the motor housing and the gear case being provided within and separable from the main appliance housing; and a bayonet lock connecting the motor housing and the gear case, wherein the bayonet lock is positioned within the main appliance housing, the bayonet lock comprising:

a first bayonet lock part on the motor housing, the first bayonet lock part being spaced radially outward from the motor rotational axis, the first bayonet lock part including one of a tongue and a curved slot, and a second bayonet lock part on the gear case, the second bayonet lock part being spaced radially outward from the motor rotational axis, the second bayonet lock part including the other of the tongue and the curved slot;

wherein the bayonet lock is selectively movable between:

a first, unlocked configuration, in which the motor shaft is rotationally interlocked with the gear stage, and the first bayonet lock part is circumferentially aligned with but rotationally offset from the second bayonet lock part with respect to the motor rotational axis, and a second, locked configuration, in which the motor shaft is rotationally interlocked with the gear stage, and the first bayonet lock part is rotated about the motor rotational axis into rotational alignment with the second bayonet lock part, such that the tongue and the curved slot are engaged.

12. An electric motor-driven kitchen appliance comprising:

a main appliance housing; and an electric motor-gear stage arrangement provided within the main appliance housing, said arrangement comprising:

an electric motor disposed within a motor housing, wherein the motor housing includes a motor housing end face, and the electric motor includes a motor shaft adapted to rotate about a motor rotational axis;

a gear stage disposed within a gear case, wherein the gear case includes a gear case end face substantially parallel to and facing the motor housing end face, said gear case being separable from the motor housing, the motor housing and the gear case being provided within and separable from the main appliance housing; and a bayonet lock connecting the motor housing and the gear case, wherein the bayonet lock is positioned within the main appliance housing, the bayonet lock comprising:

a first bayonet lock part on the motor housing, the first bayonet lock part being spaced radially outward from the motor rotational axis, the first bayonet lock part including one of a tongue and a slot, and a second bayonet lock part on the gear case, the second bayonet lock part being spaced radially outward from the motor rotational axis, the second bayonet lock part including the other of the tongue and the slot;

wherein the bayonet lock is selectively movable between:

a first, unlocked configuration, in which the motor shaft is rotationally interlocked with the gear stage, and the first bayonet lock part is circumferentially aligned with but rotationally offset from the second bayonet lock part with respect to the motor rotational axis, and a second, locked configuration, in which the motor shaft is rotationally interlocked with the gear stage, and the first bayonet lock part is rotated about the motor rotational axis into rotational alignment with the second bayonet lock part, such that the tongue and the slot are engaged.

\* \* \* \* \*